March 28, 1950     H. KUCHMAN     2,501,682
CUTTER
Filed Sept. 25, 1945
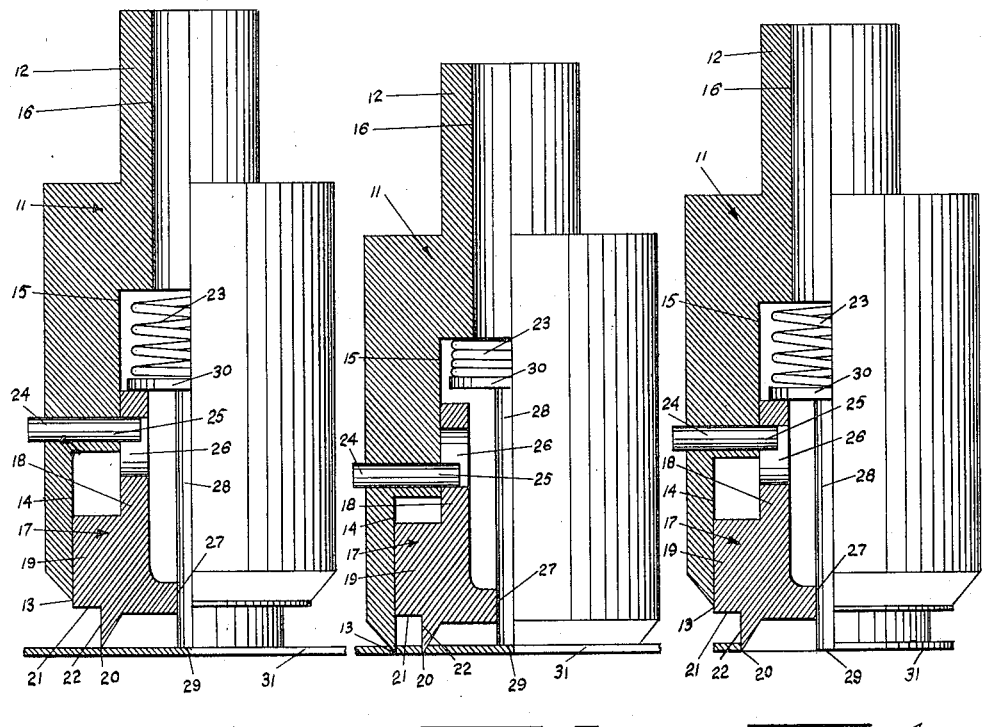
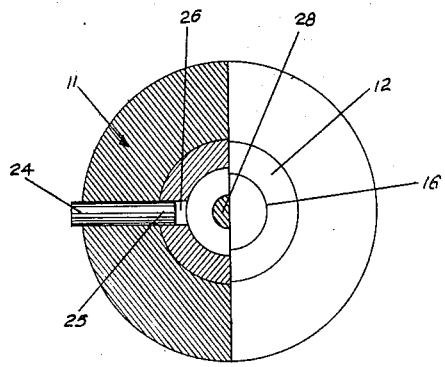
INVENTOR.
Herbert Kuchman
BY
Ralph L Chappell
ATTORNEY Patented Mar. 28, 1950

2,501,682

UNITED STATES PATENT OFFICE 2,501,682

CUTTER

Herbert Kuchman, New York, N. Y.

Application September 25, 1945, Serial No. 618,598

9 Claims. (Cl. 164—32)

(Granted under the act of March 3, 1883, as amended April 30, 1928; 370 O. G. 757)

This invention relates to a tool for cutting gaskets from a blank of material.

Relatively thin gaskets of generally annular configuration are found to have many uses. Gaskets of this type made from rubber or other suitable material find application in sealing hydraulic lines and pipe connections, for example, in the hydraulic systems of aircraft. In the manufacture of such gaskets, it is customary to cut the gaskets from a large blank of material by a rotary-cutting or stamping operation. When performing this operation it is necessary that the cutting edge of the stamping tool be initially positioned relative to the blank so that the gasket is stamped from the correct portion of the blank. It is then necessary in forming a ring-shaped gasket that two concentric cuts be made through the blank to define the outer and inner peripheries of the gasket. After cutting, it is desirable that the gaskets be withdrawn from the blank by the cutting tool and finally it is necessary that the gaskets be conditioned for removal from the cutting tool. It is further desirable in cutting gaskets having a central opening that the solid, central disc which is formed be ejected from the cutting tool. This invention provides a tool to perform all of the above functions in a single rotary-cutting or stamping operation.

An object of this invention is to provide a cutting tool having a device by which the tool can be correctly positioned for making a cut from a blank of material.

Another object is to provide a tool for simultaneously making a pair of cuts in a blank of gasket material to define the outer and inner peripheries of a gasket in a single rotary-cutting or stamping operation.

Another object is to provide a tool that withdraws the gasket from the blank of material after cutting.

Another object is to provide a tool that automatically conditions the gasket for removal from the tool after the cutting operation.

Another object is to provide a tool that automatically ejects the solid, central disc formed in cutting gaskets having a central opening.

Further objects and advantages of this invention, as well as its construction, arrangement and operation, will be apparent from the following description and claims in connection with the accompanying drawing, in which, Fig. 1 is a view partly in section and partly in elevation showing a preferred form of the invention.

Fig. 2 is a bottom plan view, partly in section of the form of invention shown in Fig. 1.

Fig. 3 is a view similar to Fig. 1, with the tool cutting a gasket.

Fig. 4 is a view similar to Fig. 1 with the tool containing a cut gasket and having ejected the solid central disc.

The cutting tool of the present invention comprises a cylindrical barrel 11 having an upwardly extending cylindrical shank 12 and a cutting edge 13 which is illustrated as being circular in shape. The end of barrel 11 adjacent cutting edge 13 is provided with a cylindrical recess 14. The central portion of barrel 11 is provided with a cylindrical recess 15 which is of smaller diameter than recess 14. Tubular shank 12 is provided with a bore 16.

Disposed within recess 14 is a tubular plunger 17 having an upwardly extending tubular shank 18 which is adapted for reciprocation within recess 15. Plunger 17 is also provided with a laterally offset flange 19 which is adapted to be guided for reciprocation within recess 14. The lower portion of plunger 17 terminates in a cutting edge 20. The external surface of plunger 17 adjacent cutting edge 20 is shaped to provide a lateral removal-conditioning wall 21 and a longitudinal wall 22. A stop pin 24 is secured within the wall of barrel 11 and is provided with a terminal portion 25 which extends inwardly through barrel 11 and into a slot 26 formed in a shank 18 of plunger 17.

The opposite ends of slot 26 by abutting against stop pin 24 limit the reciprocating movement of plunger 17 within barrel 11. In Fig. 1, plunger 17 is shown in its extreme downward position and in Fig. 3 plunger 17 is shown in its extreme upward position. Plunger 17 is provided with a central longitudinal bore 27 within which is disposed for longitudinal reciprocation a ram ejector 28 having an ejector face 29 and an enlarged head 30. Enlarged head 30 is adapted to seat against the upper extremity of plunger 17 as seen in Fig. 1. Disposed within recess 15 is a spring 23 which reacts at its upper end against the top wall of recess 15 and at its lower end reacts against ejector head 30. Spring 23 serves to urge constantly ejector 28 and plunger 17 downwardly. Ram ejector 28 is of such length that when ejector face 29 is in the plane of cutting edge 20, ejector head 30 is disposed against the end of shank 18 (Fig. 4). Ram ejector 28 can be reciprocated within bore 27 so that head 30 moves away from the end of shank 18 against the action of spring 23 to withdraw ejector face 29 above the plane of cutting edge 20 (Fig. 3).

A blank of material from which a gasket can be cut is illustrated at 31.

Operation of the cutting tool is as follows. When it is desired to cut a gasket from a blank of material 31, the cutting tool with the parts in the positions shown in Fig. 1 is placed over the gasket with cutting edges 20 of plunger 17 serving to indicate the position on the blank from which the cut will be made.

When the tool is correctly positioned by means of cutting edge 20, barrel 11 is lowered so that cutting edge 20 of plunger 17 and cutting edge 13 of barrel 11 are both resting upon the surface of gasket blank 31. Downward pressure is then applied to shank 12 to cause barrel 11 and plunger 17 to move downwardly so that cutting edges 13 and 20 penetrate through blank 31 to form a ring shaped gasket, as shown in Fig. 3. During penetration of blank 31 by cutting edges 13 and 20, ejector face 29 of ram ejector 28 rests upon the surface of blank 31 and head 30 is gradually moved away from the end of shank 18 against the action of spring 23.

Shank 12 is then withdrawn upwardly and during this operation the newly cut gasket is retained within the tool and the space defined by walls 22, 21 and 14, and is withdrawn by the tool from blank 31. As the tool is removed from blank 31, plunger 17 is reciprocated downwardly by the influence of spring 23 with the result that the removal-conditioning wall 21 forces the gasket downwardly out of recess 14 so that it drops from the tool or is manually removed therefrom.

As shank 12 is withdrawn upwardly during the operation just described ram ejector 28 reciprocates relative to plunger 17 until head 30 is in contact with the end of shank 18 and until ejector face 29 is in the plane of cutting edge 20. During said reciprocation, ejector face 29 ejects the solid central disc from the tool.

The tool of the present invention is designed for insertion in the chuck of a drill press to perform a rotary cutting operation, or the tool can be used in a punching machine to perform a reciprocating punching operation.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A cutting tool comprising a barrel having a cutting edge, a plunger mounted for longitudinal reciprocation relative to said barrel, said plunger having a cutting edge and a transverse shoulder longitudinally spaced from said plunger cutting edge and extending toward said barrel, a spring for reciprocating said plunger into outward position with said shoulder adjacent said barrel cutting edge, said plunger being adapted for reciprocation against the action of said spring into withdrawn position with said cutting edges in a common transverse plane, a slot within said plunger, a stop secured in said barrel and extending into said slot whereby said plunger is prevented from reciprocating beyond said outward and withdrawn positions, said plunger having a central bore, a ram ejector disposed for reciprocation within said bore and having an enlarged head between the end of said plunger and said spring and having an ejector face in proximity with said cutting edges.

2. A tool for cutting an annular gasket from a blank of material comprising a barrel having an annular cutting edge, a plunger mounted for longitudinal reciprocation relative to said barrel, said plunger having a cutting edge and a transverse shoulder longitudinally spaced from said plunger cutting edge and extending toward said barrel, a spring for yieldingly permitting reciprocation of said plunger into withdrawn position with said shoulder remote from said barrel cutting edge and said cutting edges in a common transverse plane whereby an annular gasket may be cut from the blank and retained between said cutting edges, said spring being adapted to reciprocate said plunger into outward position whereby said shoulder is adapted to insure removal of the gasket from between said cutting edges and to condition the gasket for removal from the tool and said plunger cutting edge extends longitudinally beyond said barrel to provide an index whereby said tool may be positioned relative to the blank of material for locating the position of a cutting operation, a slot within said plunger, a stop secured in said barrel and extending into said slot whereby said plunger is prevented from reciprocating beyond said outward and withdrawn positions, said plunger having a central bore, a ram ejector disposed for reciprocation within said bore and having an enlarged head between the end of said plunger and said spring and having an ejector face in proximity with said cutting edges whereby said ram ejector is adapted to eject from the tool the central material cut from said blank.

3. A cutting tool comprising a barrel having a cutting edge, and a plunger mounted for longitudinal reciprocation relative to said barrel and having a cutting edge, said plunger being mounted for movement into outward position with said plunger cutting edge extending outwardly of the tool beyond said barrel cutting edge, said plunger mounted for movement into withdrawn position with said cutting edges in a common transverse plane, and means for limiting withdrawal movement of said plunger so that said plunger cutting edge cannot be withdrawn beyond said barrel cutting edge.

4. A cutting tool comprising a barrel having a cutting edge, a plunger mounted for longitudinal reciprocation relative to said barrel and having a cutting edge, resilient means between said barrel and plunger for moving said plunger into outward position with said plunger cutting edge extending outwardly of the tool beyond said barrel cutting edge, said plunger being mounted for movement against the action of said resilient means into withdrawn position with said cutting edges in a common transverse plane, and means for limiting withdrawal movement of said plunger so that said plunger cutting edge cannot be withdrawn beyond said barrel cutting edge.

5. A cutting tool comprising a barrel member having a cutting edge, a plunger member mounted for longitudinal reciprocation relative to said barrel member and having a cutting edge, said plunger member being mounted for movement into outward position with said plunger cutting edge extending outwardly of the tool beyond said barrel cutting edge, said plunger member being mounted for movement into withdrawn position with said cutting edges in a common transverse plane, a slot within one of said members, and a stop secured in the other of said members and extending into said slot whereby said plunger member is prevented from moving beyond said outward and withdrawn positions.

6. A cutting tool comprising a barrel member having a cutting edge, a plunger member for longitudinal reciprocation relative to said barrel member and having a cutting edge, resilient means between said barrel member and plunger member for moving said plunger member into outward position with said plunger cutting edge extending outwardly of the tool beyond said barrel cutting edge, said plunger member being mounted for movement against the action of said resilient means into withdrawn position with said cutting edges in a common transverse plane, a slot within one of said members, and a stop secured in the other of said members and extending into said slot whereby said plunger member is prevented from moving beyond said outward and withdrawn positions.

7. A tool for cutting a piece of material from a blank of material comprising a barrel member having a cutting edge, a plunger member mounted for longitudinal reciprocation relative to said barrel member and having a cutting edge, resilient means between said barrel member and plunger member for moving said plunger member into outward position with said plunger cutting edge extending outwardly of the tool beyond said barrel cutting edge, said plunger member being mounted for movement against the action of said resilient means into withdrawn position with said cutting edges in a common transverse plane, a slot within one of said members, a stop secured in the other of said members and extending into said slot whereby said plunger member is prevented from moving beyond said outward and withdrawn positions, and means for ejecting the central cut piece of material from the tool.

8. A tool for cutting a piece of material from a blank of material comprising a barrel member having a cutting edge, a plunger member mounted for longitudinal reciprocation relative to said barrel member and having a cutting edge, resilient means between said barrel member and plunger member for moving said plunger member into outward position with said plunger cutting edge extending outwardly of the tool beyond said barrel cutting edge, said plunger member being mounted for movement against the action of said resilient means into withdrawn position with said cutting edges in a common transverse plane, a slot within one of said members, a stop secured in the other of said members and extending into said slot whereby said plunger member is prevented from moving beyond said outward and withdrawn positions, said plunger having a bore, an ejector disposed for reciprocation within said bore and having an ejector face in proximity with said cutting edges for ejecting the cut piece of material from the tool.

9. A cutting tool comprising a barrel member having a cutting edge, a plunger member mounted for longitudinal reciprocation relative to said barrel member, said plunger member having a cutting edge and a transverse shoulder longitudinally spaced from said plunger member cutting edge and extending toward said barrel member, resilient means for reciprocating said plunger member into outward position with said shoulder adjacent said barrel member cutting edge, said plunger member being adapted for reciprocation against the action of said resilient means into withdrawn position with said cutting edges in a common transverse plane, a slot within one of said members, a stop secured in the other of said members and extending into said slot whereby said plunger member is prevented from reciprocating beyond said outward and withdrawn positions, said plunger member having a central bore, and a ram ejector disposed for reciprocation within said bore and having an ejector face in proximity with said cutting edges, said ram ejector being mounted for withdrawal of said ejector face inwardly of said cutting edges against the action of said resilient means.

HERBERT KUCHMAN.

REFERENCES CITED

The following references are of record in the file of this patent:

UNITED STATES PATENTS

| Number | Name | Date |
| --- | --- | --- |
| 257,311 | Gallagher | May 2, 1882 |
| 1,109,596 | Rau | Sept. 1, 1914 |
| 1,121,776 | Stark et al. | Dec. 22, 1914 |
| 2,200,730 | Smallwood | May 14, 1940 |
| 2,368,908 | Witter | Feb. 6, 1945 |